United States Patent
François et al.

(10) Patent No.: US 6,421,089 B1
(45) Date of Patent: Jul. 16, 2002

(54) FRAME FORMAT CONVERSION PROCESS

(75) Inventors: Edouard François, Bourg des Comptes; Philippe Guillotel, Vern sur Seiche; Jean-François Vial, Rennes, all of (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/303,370

(22) Filed: Apr. 30, 1999

(30) Foreign Application Priority Data

May 6, 1998 (EP) .............................. 98401092

(51) Int. Cl.⁷ ........................... H04N 7/01; H04N 11/20
(52) U.S. Cl. ...................................... 348/445
(58) Field of Search ............................... 348/445, 451, 348/452, 458, 441, 443; H04N 7/01, 11/20

(56) References Cited

U.S. PATENT DOCUMENTS

| | | | |
|---|---|---|---|
| 5,045,939 A | 9/1991 | Okayama et al. | 358/140 |
| 5,168,362 A | 12/1992 | Yoshida | 358/171 |
| 5,218,436 A | 6/1993 | Sugiyama et al. | 358/141 |
| 5,220,423 A | 6/1993 | Chikuma | 358/140 |
| 5,243,421 A | 9/1993 | Nagata et al. | 358/140 |
| 5,262,856 A | 11/1993 | Lippman et al. | 358/136 |
| 5,287,188 A | 2/1994 | Saeger et al. | 348/565 |

FOREIGN PATENT DOCUMENTS

| | | | |
|---|---|---|---|
| EP | 514 819 A2 | 11/1992 | H04N/5/44 |
| EP | 592 136 A2 | 4/1994 | H04N/5/92 |
| EP | 734 155 A1 | 9/1996 | H04N/5/232 |

*Primary Examiner*—Michael H. Lee
(74) *Attorney, Agent, or Firm*—Joseph S. Tripoli; Joseph J. Laks; Ronald H. Kurdyla

(57) ABSTRACT

This process to convert frames into frames with a larger format is characterized in that it carries out a motion estimation (5) of the current frame relatively to a previous extended view, it compensates in motion (6) the previous extended view relatively to the current frame, it updates the previous extended view (7) by taking into account data from the current frame to give an updated extended view becoming the previous extended view for the motion estimation of the next current frame, it completes the current frame (8) with data from the up-dated extended view to provide the frame with a larger format.

The applications concern the 4/3 to 16/9 TV format conversion for 16/9 TV sets.

23 Claims, 4 Drawing Sheets

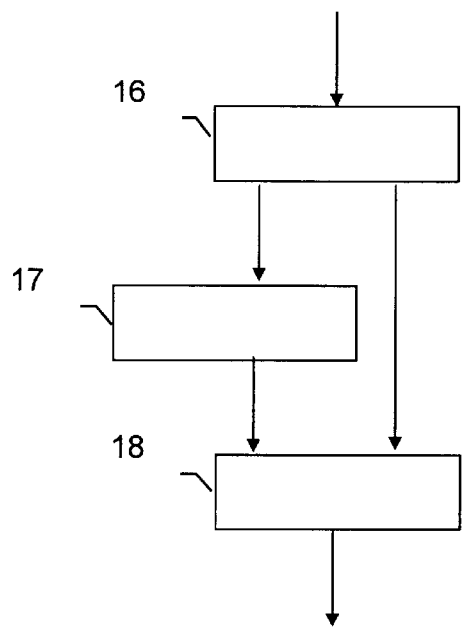
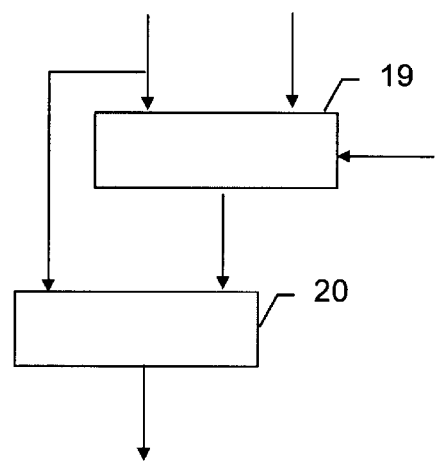
FIG 7          FIG 8
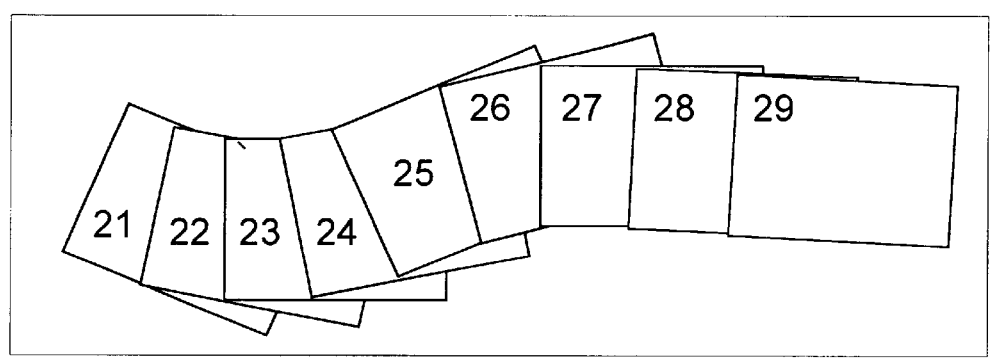
FIG 9

FRAME FORMAT CONVERSION PROCESS

FIELD OF THE INVENTION

The invention relates to a 4/3 to 16/9 TV format conversion process. It also relates to a converter for the implementation of this process.

BACKGROUND OF THE INVENTION

Usual 4/3-to-16/9 TV format conversion can be achieved in different ways. FIG. 1a shows a frame of a virtual scene generated by a 4/3 camera and FIG. 1b one generated by a 16/9 camera.

FIG. 2 illustrates known ways to convert a 4/3 TV format to a 16/9 TV format:

The simplest method consists of keeping the 4/3 format and filling the empty parts of the 16/9 frame by black bands, as shown on FIG. 2a.

Another type of methods consists of distorting or cutting the 4/3 source frame in order to obtain a 16/9 frame:

- horizontal zoom which horizontally extends the 4/3 frame (FIG. 2b)
- zoom and cutting of the high and low parts of the frame (FIG. 2c)
- the same zoom, but only the high part of the frame is cut in order to keep the sub-titles (FIG. 2d)
- linear zoom, that is the zoom factor varying in the frame; near to 1 on the center, it takes its maximum values near the frame borders (FIG. 2e).

A compromise between these methods may also be used.

A last type of methods aims at creating the missing information on the borders by specific techniques:

- duplication of the border rows or lines
- mirror effect (FIG. 2f)
- padding methods, adapted deformations taking into account the objects edges, fractals . . .

These different methods can be applied either directly on the TV set or before the video broadcasting in a post-production process. It is clear that these techniques do not allow to create the true information, that is the entire frame of the scene filmed by a 16/9 camera, even if they are achieved in post-production.

All theses techniques deteriorate the overall image quality by adding false information (this added information not representing the actual missing part of the image), by suppressing information or by distorting the image when using information intrinsic to the 4/3 format image.

SUMMARY OF THE INVENTION

The object of the invention is to overcome the aforementioned drawbacks.

To this end, the subject of the invention is a format conversion process for a video sequence made up of a succession of frames with a given format to convert these frames into frames with a larger format, characterized in that

- it carries out a motion estimation of the current frame relatively to a previous extended view,
- it compensates in motion the previous extended view relatively to the current frame,
- it updates the previous extended view by taking into account data from the current frame to give an updated extended view becoming the previous extended view for the motion estimation of the next current frame,
- it completes the current frame with data from the up-dated extended view to provide the frame with a larger format.

Another subject of the present invention is a format conversion process for a video sequence made up of a succession of frames of a given format to convert these frames into frames with a larger format, characterized in that this conversion is carried out in two passes, one to estimate the motion between successive frames and to built an extended view of the sequence with the frames compensated in motion, the other by positioning each frame of the sequence relatively to the extended view by taking into account the calculated motion and by completing it with extended view data corresponding to the larger format.

According to a particular aspect of the invention, the process is characterized in that the motion estimation is a global motion robust estimation based on an affine modelization of the 2D apparent motion.

According to another particular aspect of the invention, the process is characterized in that the motion estimation is based on the spatio-temporal gradients of the frame luminance.

The invention also relates to a 16/9 television set characterized in that it comprises a converter implementing the format conversion process.

This invention aims at generating a full 16/9 frame from a 4/3 format frame by using an extended view memory built from successive frames of the video plan.

The claimed extended view generation process consists of accumulating successive 4/3 frames and mixing them to produce a bigger one, ideally at the 16/9 format or more. If the camera and the scene background are totally static, this process will produce a final frame with exactly the same size as the 4/3 frame. But as soon as the camera moves (and especially when a panning motion is applied), a larger part of the scene is seen through the successive frames of the video plan, and hence it is possible to produce a larger frame of the scene. If this larger frame is stored in an extended view memory, the 4/3 frame can be completed by this extended view to produce the 16/9 frame of the scene as if it was seen by a 16/9 camera.

Reconstructing the missing parts of the 16/9 frame by using an extended view memory built from successive frames of the video plan allows to get 16/9 frames without distortion or false information, increasing the image quality.

BRIEF DESCRIPTION OF THE DRAWINGS

Other features and advantages of the invention will emerge clearly in the following description given by way of non-limiting examples in conjunction with the appended figures which represent.

DETAILED DESCRIPTION OF PREFERED EMBODIMENTS

Figure 1:
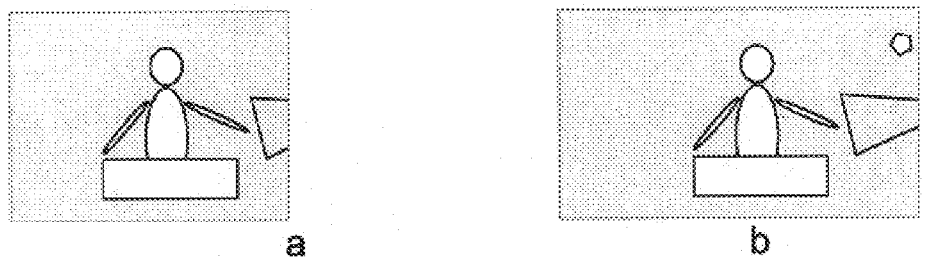
FIGS. 1a and 1b, frames from 4/3 and 16/9 sources
Figure 2:
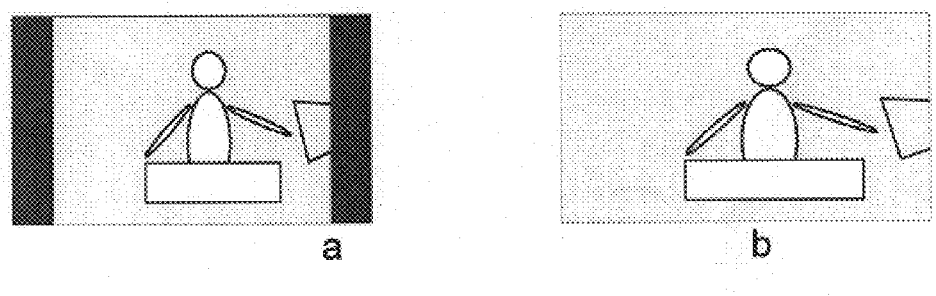
FIGS. 2a to 2f, means to convert the format from 4/3 to 16/9, according to the prior art FIG. 3, the use of an extended view memory to reconstruct the 16/9 frame FIG. 4, an algorithm to implement the process in the on-line configuration FIG. 5, the mixture of the current extended frame with a current frame FIG. 6, the mixture of the current layer frame with successive frames in the on-line case FIG. 7 and FIG. 8, algorithms to implement the process in the off-line configuration FIG. 9, the mixture of the current layer with successive frames in the off-line case.
Figure 2:
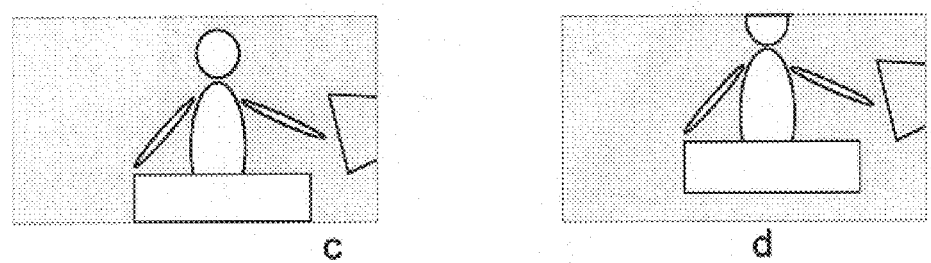
Figure 2:
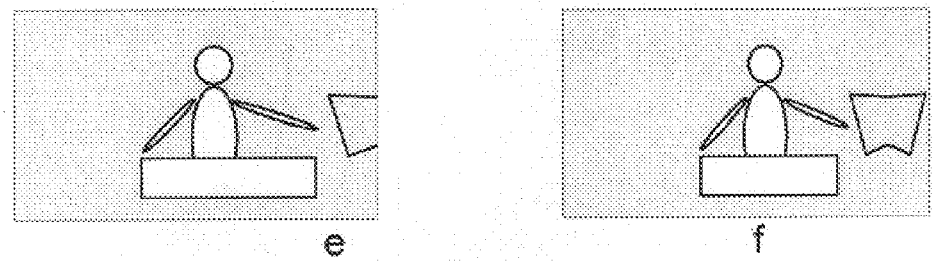
Figure 3:
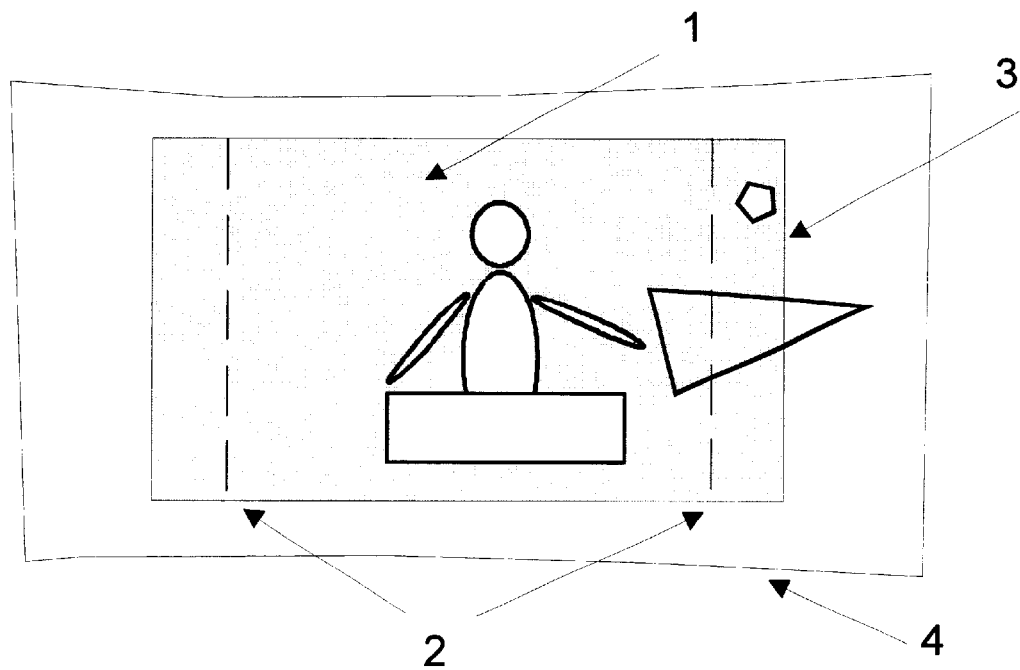

FIG. 3 shows the use of an extended memory to reconstruct the 16/9 frame. A 4/3 frame 1 which limits 2 are represented by dotted lines on the right and left side is related to the current frame which is to be enlarged. The 16/9 frame 3 is the reconstructed frame taking into account the data of the 4/3 current frame and neighboring frames in the sequence. To carry out such a reconstruction, an extended view memory 4 is used to memorize processed data from previous and following frames (when off-line configuration is used as explained hereafter). For example, part of the triangle appearing at the right of the 4/3 frame 3 can be completed in the extended view memory by using data from the next 4/3 frames data, only the relevant parts of this triangle, those corresponding to the 16/9 size, been displayed on the 16/9 frame. A typical extended view could be a large view of the scene filmed by a panning motion.

The implementation of the process is slightly different depending on the considered configuration:

"on line" configuration

The conversion is applied "on-line", that is in real-time, for instance directly on the TV set. In this case, the extended view is progressively up-dated along the video plan. Consequently, it is necessarily smaller at the beginning of the video plan than at the end, and the 16/9 frame is more and more filled as the extended view size increases.

"off line" configuration

The conversion process is applied "off-line". This implies a delay in the generation of the 16/9 frame, which reduces the possibilities of using such a process directly on the TV set. In this case, the process should be preferably used as a post-production treatment. However, in the context of the MPEG-4 standard, this type of extended view memory can be computed at the encoder and transmitted as it is to the decoder which has no more computation to perform.

Figure 4:
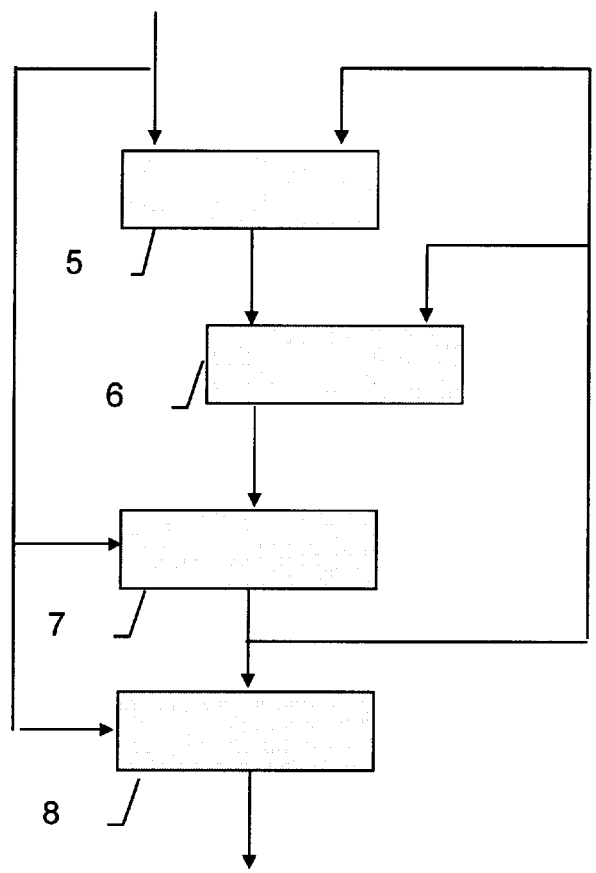

FIG. 4 illustrates the process for the on-line configuration and the algorithm is described hereafter.

A first step 5 of the process carries out a motion estimation between the current frame data and the previous extended view data to provide motion data. A second step 6 processes the previous extended view data, by using these motion data (motion vectors), to calculate motion compensated extended view data. The third step 7 performs the extended view updating from these extended view data and the current frame data. These up-dated extended view data related to the current 4/3 frame are sent back to the first and second step to be used as previous extended view data when receiving the next current 4/3 frame. The fourth step 8 receives the current frame data and the updated extended view data to carry out the 16/9 frame filling to make available the current completed 16/9 frame.

Initially, the extended view is the first source frame of the video plan. Then, given the previous extended view, a global motion estimation between this extended view and the current 4/3 source frame is performed by the first step 5.

Concerning the motion model, the affine modelization of the 2D apparent motion in a video sequence is chosen for being one of the best compromises between the computation complexity (only 6 parameters have to be identified) and the physical reality (that is the correct representation of the 2D apparent motion).

A 2D motion vector $\vec{\omega}_\theta(x,y)$ of a point (x,y) in the frame is modeled using six motion parameters $\theta=(a,b,\alpha,\beta,\gamma,\delta)^\tau$ in the following way:

$$\vec{\omega}\theta(x,y) = \begin{pmatrix} dx \\ dy \end{pmatrix} \text{ with } \begin{pmatrix} dx = a + \alpha \cdot x + \gamma \cdot y \\ dy = b + \beta \cdot x + \delta \cdot y \end{pmatrix}$$

The parameters are calculated for the whole frame. Given the coordinates x, y of a pixel, a motion vector is deduced from these parameters.

This calculation allows to avoid the costly dense motion field estimation, which moreover can fail when large motions are present.

The global motion estimation process is based on the spatio-temporal gradients of the frame luminance, which are linked to the 2D apparent motion by the "optic flow constraint equation".

We suppose that the luminance $I_{x,y,t}$ of a pixel with coordinates x, y, in the frame at the instant t doesn't change after its motion dx, dy during the time dt, what can be expressed by:

$$I_{x,y,t} = I_{x+dx,y+dy,t+dt}$$

A first order development gives the following equation:

$$I_{x,y,t} = I_{x,y,t} + \frac{\partial I_{x,y,t}}{\partial x} dx + \frac{\partial I_{x,y,t}}{\partial y} dy + \frac{\partial I_{x,y,t}}{\partial t} dt$$

which can be simplified:

$$\Delta I_x \cdot dx + \Delta I_y \cdot dy + \Delta I_t = 0$$

where $\Delta I_x$, $\Delta I_y$ and $\Delta I_t$ are the estimated derivatives of the luminance function. $\Delta I_x$ and $\Delta I_y$ may be computed as the luminance difference between a pixel and his neighbour respectively on the same line and same column, $\Delta I_t$ may be computed as the luminance difference between a pixel and the corresponding one in the motion compensated neighbour frame.

Actually the value $\Delta Ixdx+\Delta Iydy+\Delta It$ is not equal to zero but to a noise (error) due to the approximations in motion and luminance. This leads to consider at each pixel (x,y) the following observation (error):

$$\varepsilon(x, y, \theta) = dx \cdot \Delta I_x + dy \cdot \Delta I_y + \Delta I_t$$
$$= (a + \alpha \cdot x + \gamma \cdot y) \cdot \Delta I_x + (b + \beta \cdot x + \delta \cdot y) \cdot \Delta I_y + \Delta I_t$$

The basic problem of the motion model parameters estimation is to identify the dominant motion even if small areas in the frames have a different motion. The most adapted technique for solving this problem is a robust estimation method, which allows the elimination of erroneous samples in the estimation process. In our example, the chosen method is derived from the iteratively reweighted least squares. The variables $\varepsilon(x,y)$ are supposed to be distributed as an independent centered gaussian law of same variance for each pixel.

In order to be able to estimate large motions, the process is applied in a multiresolution way: a multiresolution pyramid of the two frames is firstly built; then the estimation process is applied from the coarsest to the finest resolution, by using as initial estimate of the motion parameters at a given level the estimation from the coarser level.

The variance $\hat{\sigma}_0^2$ (^=estimated value) is initially fixed to a given value, 50 in our example. In the same way, the initial global motion parameters vector $\hat{\theta}_0$ is set to:

the null vector if the process is just starting for the video plan;

the previous value (that is the vector from the previous time), rescaled by taking into account the higher resolution level, if the process is just starting for the current frame.

Then an iterative process is applied.

Let k be the current iteration number. From the current estimation of the motion parameters vector $\hat{\theta}_{k-1}$, a motion compensation of the extended view is achieved, and the spatio-temporal gradients maps are computed. The continuation of this process consists of progressively correcting the first estimate of q until this correction becomes low. For each pixel (x,y) and each iteration, a weighting coefficient wck (x,y) is evaluated:

$$wc_k(x, y) = \frac{\hat{\sigma}_{k-1}^2}{\hat{\sigma}_{k-1}^2 + \Delta I_t(x, y)^2}$$

An estimation of $d\hat{\theta}_{k-1}$ using the weighted least squares method is performed, with weighting coefficients wck(x,y):

$$d\hat{\theta}_k = \min_\theta \sum wc_k(x, y) \cdot \varepsilon^2(x, y, \theta)$$

The weighted least squares method for the estimation of dθk consists of calculating the variation of the motion parameters relatively to the ones corresponding to the previous iteration, allowing to minimize the sum, on the whole frame, of the weighted squared error. The derivatives of the sum of the weighted squared errors relatively to each variable [parameter] are put equal to zero, giving six equations for six parameters.

Then the variance of the noise is estimated again, taking into account only the weighted DFD, as giving better results:

$$\hat{\sigma}_k^2 = \frac{\sum wc_k(x, y) \cdot \Delta I_t(x, y)^2}{\sum wc_k(x, y)}$$

the mean value of the DFD, on the whole frame, being assumed to be equal to zero.

The global motion parameters vector is up-dated:

$$\hat{\theta}_k = \hat{\theta}_{k-1} + d\hat{\theta}_k$$

At the first iteration of the first frame of the sequence, the motion is taken equal to zero (the motion parameters vector is the null vector). This hypothesis corresponds to the low resolution frame where the motion can be considered as smaller. The calculation of $\Delta It(x, y)$ corresponds to the difference in luminance between pixels of consecutive frames having the same coordinates (no motion).

For the other iterations, $\Delta It(x, y)$ corresponds to the DFD or Displaced Frame Difference which is the luminance difference of the pixels linked by the motion vector. The greater this difference, the smaller the weighting coefficient, giving less weight to the pixels.

The process is iterated until the amplitude of the estimated global motion parameters correction becomes lower than a given threshold. The resulting motion parameters vector $\hat{\theta}$ is considered to be the robust estimation of the dominant motion parameters vector.

The successive iterations (usually two or three iterations are sufficient) allow to minimize the influence of the motion which is not predominant in the frame (usually the foreground) and the result corresponds to the global motion which is usually the one corresponding to the background.

During the second step 6, the previous extended view is motion-compensated with the estimated global motion parameters, in order to correctly superpose this extended view to the current 4/3 frame. The next step 7 consists of up-dating the motion compensated extended view by taking into account the current 4/3 frame. This step generates an up-dated version of the extended view from the previous extended view and the current 4/3 frame. The updated extended view, which is explained thereunder, is then filled using data from the current 4/3 frame.

The generation of an extended view of a video sequence is based on the accumulation of several views of a same rigid layer by motion compensating the successive frames of the sequence.

Several techniques may be applied. For example, an approach consists of segmenting, on a motion criterion, the successive frames to extract the different layers of the scene. This allows to isolate the background layer and to reject the other ones.

This segmentation process is not necessary when performing the global motion estimation above described which allows to weight the areas where the motion is very different from the global motion (foreground areas). This global motion corresponds to the motion of the background layer. Of course, it is supposed that the background motion is predominant in the frame. A way to determining if this background motion is dominant is based on the estimated variance analysis. If the variance is too high, the process "motion estimation—extended view generation" is stopped and the format conversion is achieved using classical techniques.

Two techniques for generating the extended view are proposed hereafter. But the process can be used with another technique. Once the current extended view has been fitted to the current frame by the global motion compensation, step 6, two types of pixels are present:

innovation pixels of the current frame without any corresponding pixel in the current layer frame;

redundant pixels of the current frame with a corresponding pixel in the current layer frame.

The next step 7 updates the extended view from the motion compensated extended view and the current 4/3 frame. For notation convenience, the previous motion compensated extended frame will be denoted $ExtFr_{n-1}$, the current one (being built) $ExtFr_n$, and the current frame $Fr_n$.

A first means to update the extended frame is to use a first order filtering.

The extended frame, which is usually the background layer, is up-dated "on-line". In this approach, the innovation pixels are simply considered as initialization of the layer or extended frame:

$$ExtFr_n(x,y) = Fr_n(x,y)$$

Redundant pixels are mixed to the previous extended frame pixels using the following first order filtering:

$$ExtFr_n(x,y) = \alpha Fr_n(x,y) + (1-\alpha)ExtFr_{n-1}(x,y)$$

where α is a coefficient which allows to control the innovation weight.

Figure 5:
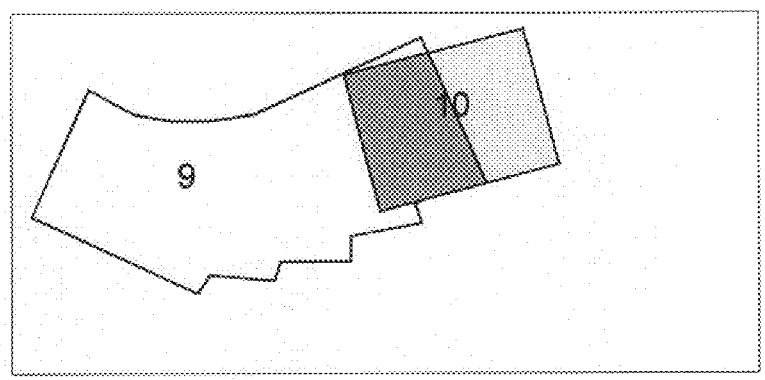

FIG. 5 shows a mixture of the previous extended frame with the current frame. In deep gray are represented the redundant pixels which are part of the previous extended frame 9 and the current frame 10 and in light gray are represented innovation pixels which are only part of the current frame. This approach only requires one extended frame memory and the current frame memory. This method takes into account all the pixels of the current frame but the successive filterings allow to reduce the weight of the pixels not corresponding to the background layer.

A second means to update the extended view is to use a median filtering.

This means consists of accumulating several source 4/3 frames after global motion compensation and median filtering for each pixel belonging to the layer.

This requires an extended view memory and as many frame memories as frames taken into account in the median filtering.

Figure 6:
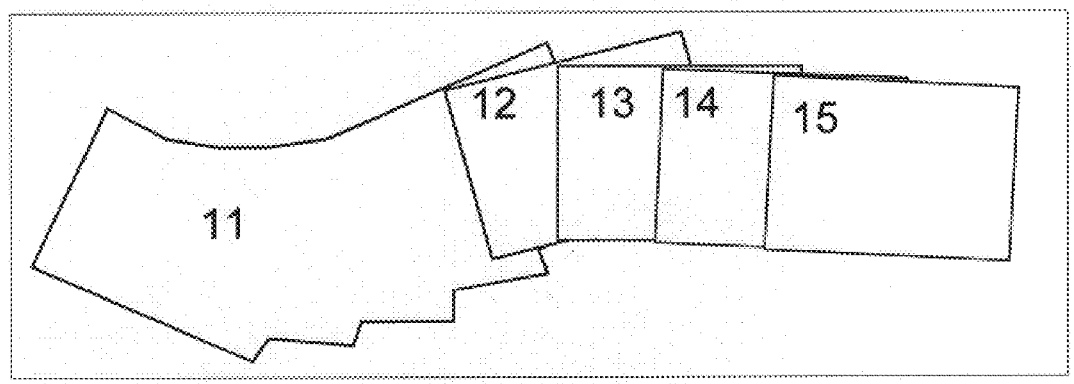

FIG. 6 shows a mixture of the current layer frame 11 with successive frames 12, 13, 14, 15. In this example, the analysis window to calculate the current layer frame consists of 5 frames. Frames 12 to 15 are positioned relatively to the current layer frame 11. As median filtering is performed, an odd number of frames is used to calculate the current layer frame. When the number of pixels put in correspondence is even, a filtering using a weighting coefficient α, as described above, can be performed.

Once the extended view has been built at step 7, the final 16/9 frame filling process can be carried out at step 8. The center part of the 16/9 frame is filled by the 4/3 frame. A mixing method as the filtering is performed, for instance the first order filtering described for up-dating the initial 16/9 frame. Of course, another mixing method can be used.

In any case, the remaining empty parts of the 16/9 frame must be filled with one of the other techniques mentioned before.

FIGS. 7 and 8 illustrate the process for the off-line configuration and the steps of the algorithm are described hereafter. Only differences with the on-line configuration are described.

In the "off-line" case, the process works in two passes. First, the extended view is built once from an analysis of the whole video plan (or a large part of it). Then the filling process is applied in a new pass, after this complete reconstruction, and the successive 16/9 frames are filled with the same and unique extended view.

FIG. 7 corresponds to the first pass, achieving the generation of the extended view.

A first step 16 of the process carries out a motion estimation between successive 4/3 frames of the video plan. Successive global motion vectors are calculated and sent, with the 4/3 frames, to a second step 17 which performs motion compensation to the successive 4/3 frames. The successive motion compensated 4/3 frames and the successive global motion vectors are processed at step 18 which generates a complete extended view.

FIG. 8 corresponds to the second pass achieving the 4/3 to 16/9 conversion.

First step 19 receives the current frame and the complete extended view calculated during the first pass to carry out motion compensation of the complete extended view, using global motion also calculated during the first pass. Second step 20 receives the current frame and the motion compensated extended view from the previous step to perform the filling of the current 4/3 frame.

During the first pass, each frame of the sequence is motion-compensated relatively to the previous one, step 17, this succession of frames, adjusted in position, allowing to generate, step 18, the complete extended view. This up-dating of the extended view can be performed in the same way as in the on-line configuration:

updating by using a first order filtering updating by using a median filtering

This filtering consists of accumulating several source 4/3 frames after global motion compensation and median filtering for each pixel belonging to the layer.

The second pass allows to position the extended view relatively to the current 4/3 frame. This motion-compensation uses the global motion parameters which have been computed and stored during the first pass. Then the 16/9 frame filling is performed on the current 4/3 frame by using the data from the positioned extended view.

FIG. 9 shows a succession of 9 frames of a video plan, 21 to 29, the whole set being treated all together, during a first pass, to produce once the final extended view. It requires as many frame memories as the sequence contains and consequently is more memory consumary than the "on-line" approach.

The duration to reconstruct the final extended view depends on the number of frames to be processed.

What is claimed is:

1. A format conversion process for a video sequence made up of a succession of frames with a given format to convert these frames into frames with a larger format, consisting in:
   carrying out a motion estimation of the current frame relatively to a previous extended view,
   compensating in motion the previous extended view relatively to the current frame,
   updating the previous extended view by taking into account data from the current frame to give an updated extended view becoming the previous extended view for the motion estimation of the next current frame,
   completing the current frame with data from the up-dated extended view to provide the frame with a larger format.

2. A format conversion process for a video sequence made up of a succession of frames of a given format to convert these frames into frames with a larger format, wherein this conversion is carried out in two passes, a first and a second pass
   said first pass comprising the following steps:
      estimating the motion between successive frames in order to calculate frames compensated in motion,
      building an extended view of the sequence with the frames compensated in motion,
   said second pass comprising the following steps:
      positioning the extended view relatively to a frame of the sequence by taking into account the estimated motion,
      completing said frame with extended view data corresponding to the larger format.

3. A process according to claim 1, wherein the motion estimation is a global motion robust estimation based on an affine modelization of the 2D apparent motion.

4. A process according to claim 2, wherein the motion estimation is a global motion robust estimation based on an affine modelization of the 2D apparent motion.

5. A process according to claim 1, wherein the motion estimation is based on the spatio-temporal gradients of the frame luminance.

6. A process according to claim 2, wherein the motion estimation is based on the spatio-temporal gradients of the frame luminance.

7. A process according to claim 1, wherein the motion estimation consists of:
   attributing to each pixel with coordinates x, y, a motion vector, which components dx, dy are affine functions of the pixel coordinates, $$dx = a + \alpha x + \gamma y$$

$$dy = b + \beta x + \delta y$$

calculating the parameters α, γ, b, β, δ by the method of the reweighted least squares applied to the error ε:

$$\epsilon(x, y, \theta) = dx.\Delta I_x + dy.\Delta I_y + \Delta I_t$$

where $\Delta I_x$, $\Delta I_y$, $\Delta I_t$ are the estimated horizontal, vertical and temporal luminance gradients.

8. A process according to claim 2, wherein the motion estimation consists of:

attributing to each pixel with coordinates x, y, a motion vector, which components dx, dy are affine functions of the pixel coordinates, $$dx = a + \alpha x + \gamma y$$

$$dy = b + \beta x + \gamma y$$

calculating the parameters a, $\alpha$, $\gamma$, b, $\beta$, $\delta$ by the method of the reweighted least squares applied to the error $\epsilon$:

$$\epsilon(x, y, \theta) = dx.\Delta I_x + dy.\Delta I_y + \Delta I_t$$

where $\Delta I_x$, $\Delta I_y$, $\Delta I_t$ are the estimated horizontal, vertical and temporal luminance gradients.

9. A process according to claim 1, wherein the motion estimation is a hierarchical estimation using multiresolution pyramidal frame structures.

10. A process according to claim 2, wherein the motion estimation is a hierarchical estimation using multiresolution pyramidal frame structures.

11. A process according to claim 1, wherein the updating of the extended view comprises the steps of:

determining an extended view rigid layer (background layer) by performing a dense motion vector field estimation and a motion segmentation to separate the layers completing the extended view layer by adding the new pixels of the current frame corresponding to the same layer.

12. A process according to claim 2, wherein the building of the extended view comprises the following steps of:

determining an extended view rigid layer (background layer) by performing a dense motion vector field estimation and a motion segmentation to separate the layers cumulating views of the extended view rigid layer from the frames compensated in motion performing an a posteriori median filtering on the corresponding pixels of the cumulated views.

13. A process according to claim 1, wherein the updating of the previous extended view comprises the steps of:

determining redundancy pixels of the current frame having a corresponding pixel in the previous extended view calculating values of these redundancy pixels by filtering the corresponding values in the previous extended view and in the current frame.

14. A process according to claim 2, wherein the building of the extended view comprises the steps of:

determining redundancy pixels of the current frame having a corresponding pixel in the extended view calculating values of these redundancy pixels by filtering the corresponding values in the extended view and in the current frame.

15. A process according to claim 1, wherein the updating of the extended view comprises the steps of:

accumulating several frames to the previous extended view, after being motion compensated filtering the corresponding pixels of the cumulated frames and extended frame to get the next extended view.

16. A process according to claim 2, wherein the building of the extended view comprises the steps of:

accumulating several frames after being motion compensated filtering the corresponding pixels of the cumulated frames to give the extended view.

17. A process according to claim 1, wherein the updating process fills the remaining holes by using one or a mixture of methods such as mirror effect, padding, repetition of the borders.

18. A process according to claim 2, wherein the building process fills the remaining holes by using one or a mixture of methods such as mirror effect, padding, repetition of the borders.

19. A process according to claim 1, wherein the given format is a 4/3 TV format and the larger one is a 16/9 TV format.

20. A process according to claim 2, wherein the given format is a 4/3 TV format and the larger one is a 16/9 TV format.

21. A process according to claim 1, wherein the given format is a 16/9 TV format and the larger one is a 4/3 TV format.

22. A process according to claim 2, wherein the given format is a 16/9 TV format and the larger one is a 4/3 TV format.

23. 16/9 television set comprising a converter implementing the format conversion process according to claim 1.

* * * * *